United States Patent
Tung

(10) Patent No.: US 7,600,004 B2
(45) Date of Patent: Oct. 6, 2009

(54) NETWORK SETTING CONFIGURATION SYSTEMS AND METHODS

(75) Inventor: Chung Chih Tung, Taipei (TW)

(73) Assignee: Mitac Technology Corp., Hsinchu (TW)

( * ) Notice: Subject to any disclaimer, the term of this patent is extended or adjusted under 35 U.S.C. 154(b) by 735 days.

(21) Appl. No.: 11/017,322

(22) Filed: Dec. 20, 2004

(65) Prior Publication Data

US 2006/0136594 A1    Jun. 22, 2006

(51) Int. Cl.
    *G06F 15/177*    (2006.01)
(52) U.S. Cl. .................. 709/220; 709/221; 709/227; 709/228
(58) Field of Classification Search ......... 709/220–222, 709/227, 228
    See application file for complete search history.

(56) References Cited

U.S. PATENT DOCUMENTS

| | | | | |
|---|---|---|---|---|
| 5,666,481 A * | 9/1997 | Lewis | .............................. | 714/4 |
| 6,253,334 B1 * | 6/2001 | Amdahl et al. | .............. | 709/239 |
| 6,308,282 B1 * | 10/2001 | Huang et al. | ................... | 714/4 |
| 6,360,332 B1 * | 3/2002 | Weinberg et al. | ............... | 714/4 |
| 6,581,166 B1 * | 6/2003 | Hirst | | |
| 6,658,463 B1 * | 12/2003 | Dillon et al. | ................. | 709/219 |
| 6,874,147 B1 * | 3/2005 | Diamant | ..................... | 719/328 |
| 6,968,394 B1 * | 11/2005 | El-Rafie | ..................... | 709/245 |
| 7,002,971 B1 * | 2/2006 | Enns et al. | .................... | 370/401 |
| 7,127,506 B1 * | 10/2006 | Schmidt et al. | ............. | 709/224 |
| 2001/0023446 A1 * | 9/2001 | Balogh | ........................ | 709/229 |
| 2001/0052084 A1 * | 12/2001 | Huang et al. | ................... | 714/4 |
| 2003/0079056 A1 * | 4/2003 | Taylor | ........................... | 710/1 |
| 2003/0229900 A1 * | 12/2003 | Reisman | ..................... | 709/228 |
| 2004/0266436 A1 * | 12/2004 | Jaakkola et al. | ............. | 455/436 |
| 2005/0050379 A1 * | 3/2005 | Gale et al. | ...................... | 714/4 |

* cited by examiner

*Primary Examiner*—Phuoc Nguyen
(74) *Attorney, Agent, or Firm*—Quintero Law Office

(57) ABSTRACT

A network settings configuration system, implemented by a computer capable of network connection to another network entity. The network settings configuration system includes a library and a connection initiation unit. The library stores a plurality of groups of network protocol settings each containing a plurality of settings values. The connection initiation unit initiates a first network connection according to values of a first set of network protocol settings and, when failing to initiate the first network connection, initiates a second network connection according to values of a second set of network protocol settings.

18 Claims, 4 Drawing Sheets

NETWORK SETTING CONFIGURATION SYSTEMS AND METHODS

BACKGROUND

The invention relates to methods and systems for configuring network settings, and in particular, to methods and systems for automatically changing network protocol settings for network connections.

A computer must retrieve network protocol settings before successfully establishing a connection to another network entity. Typically, network protocol settings are configured infrequently via an operating system (OS). Mobile computers, such as notebook computers, however, may connect to the Internet in different network environments requiring different network protocol settings. Hence, a mobile computer may be unable to connect to the Internet in different network environments with their original network protocol settings. Typically computers require several network protocol settings such as Internet Protocol (IP) addresses, a default gateway, Windows Internet Name Service (WINS) servers, a Domain Name System (DNS) server, and a proxy server. Thus, reconfiguring network protocol settings can be inconvenient.

SUMMARY

Accordingly, some embodiments of the invention provide a network settings configuration system, implemented in a computer capable of network connection to another network entity. The network settings configuration system comprises a library and a connection initiation unit. The library stores a plurality of network protocol settings groups each comprising a plurality of settings values. The connection initiation unit initiates a first network connection according to values of a first group of network settings, and when failing to initiate the first network connection, initiates a second network connection according to values of a second group of network protocol settings.

Additionally, the network settings configuration system further comprises a display module and an input module. The display module comprises a plurality of regions respectively representing the groups of network protocol settings therein. The input module receives network protocol settings values.

Embodiments of the invention additionally provide a network settings configuration method, implemented in a computer capable of network connection to another network entity. First, a plurality of groups of network protocol settings are stored, each comprising a plurality of settings values. A first network connection is initiated according to values of a first group of network protocol settings. When the first network connection fails to be initiated within a predetermined period, a second network connection is initiated according to values of a second group of network protocol settings.

DESCRIPTION OF THE DRAWINGS

Embodiments of the invention can be more fully understood by reading the subsequent detailed description and examples with references made to the accompanying drawings, wherein.

DETAILED DESCRIPTION

The network settings configuration system according to embodiments of the invention may be implemented by a computer, such as a notebook or a personal digital assistant (PDA). The network settings configuration system in FIG. 1 comprises library 10, connection initiation module 12, display module 14, and input module 16.

Library 10 may be implemented by a program comprising different groups of network protocol settings, each including a plurality of settings values. Connection initiation module 12 establishes connections between the computer and another network entity based on the groups of network protocol settings. When initiation of a connection utilizing a first group of network protocol settings fails, connection initiation module 12 utilizes a second group of network protocol settings to initiate another connection.

Display module 14 comprises a plurality of regions. Different groups of network protocol settings acquired from library 10 are presented in the display regions. Input module 16 switches the network settings configuration system to a configuration mode in which input module 16 receives network protocol settings values input by a user.

Figure 1:
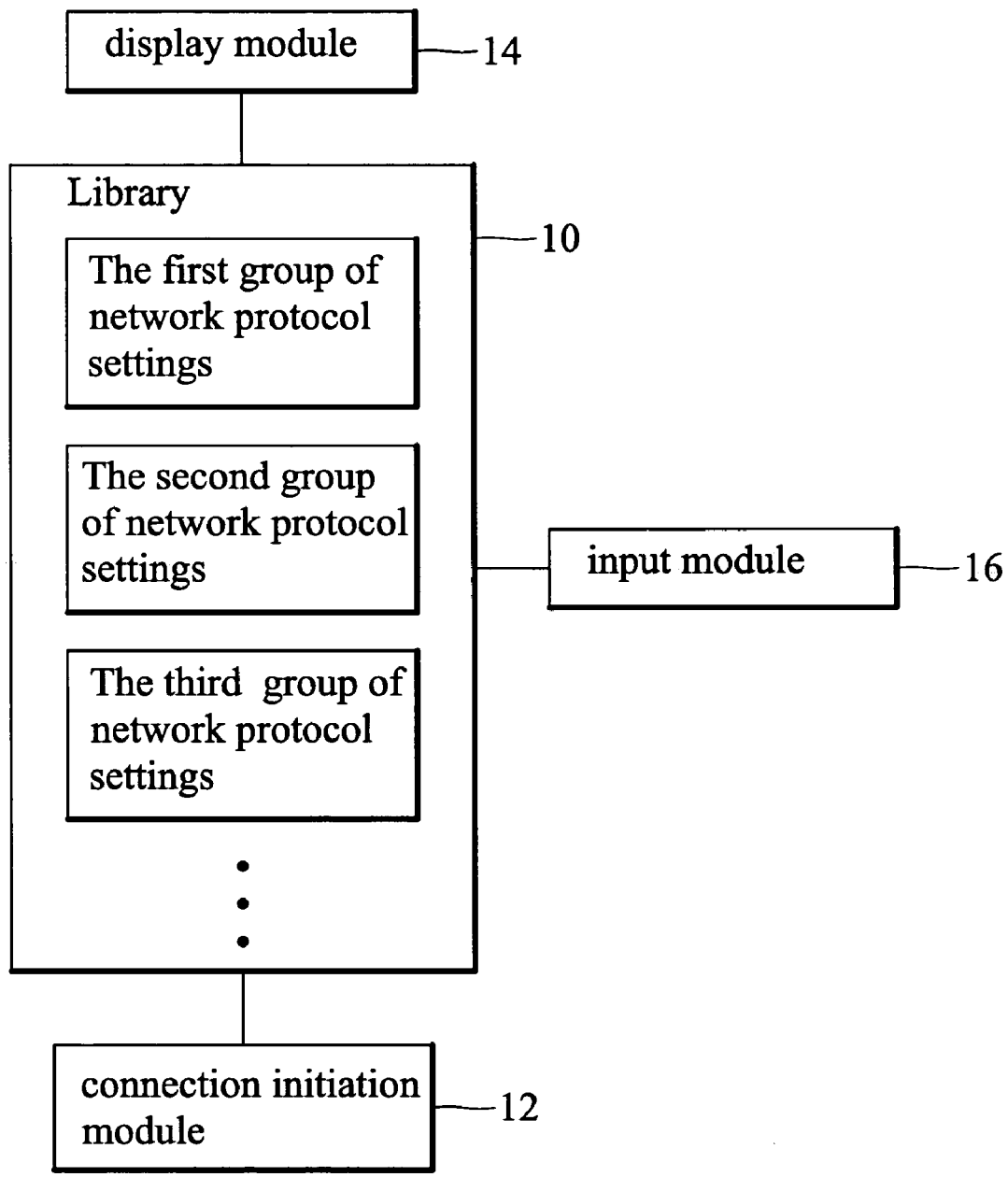
FIG. 1 is a block diagram of a network settings configuration system according to an embodiment of the invention.
Figure 2:
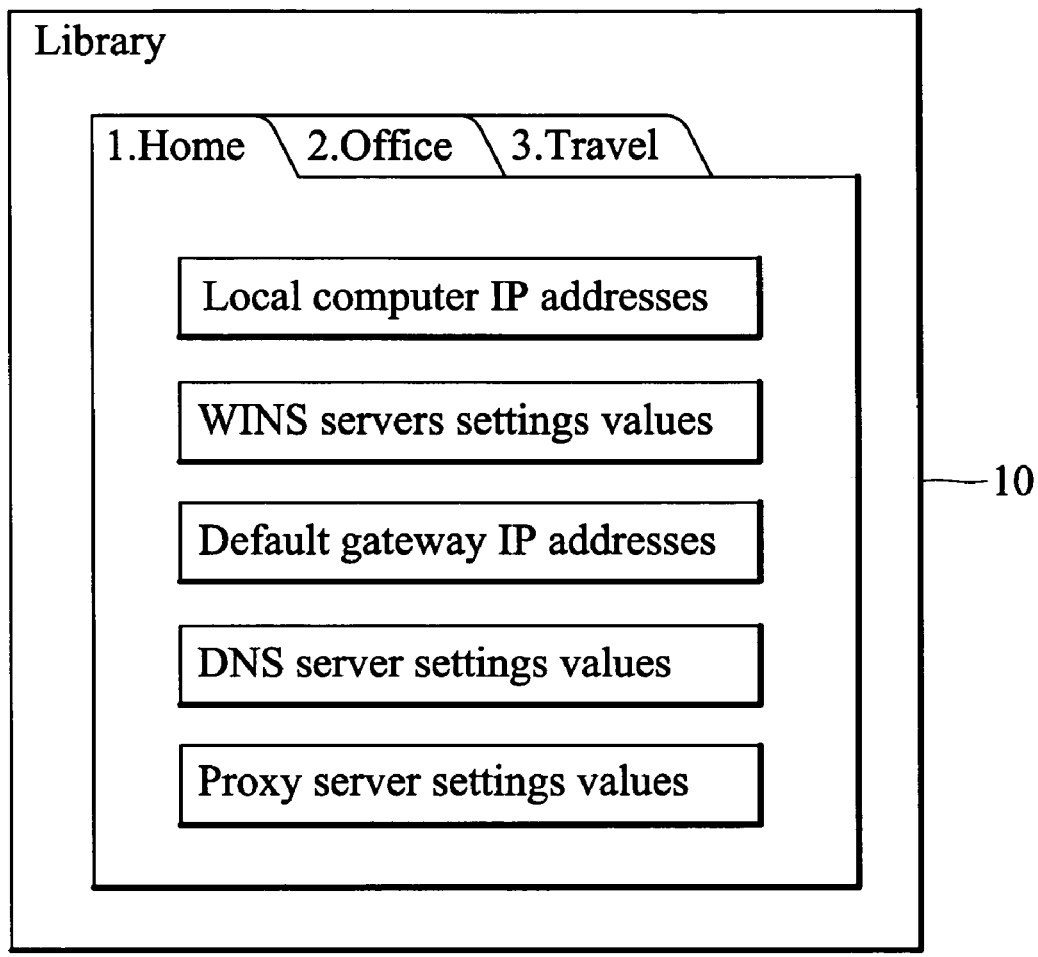
FIG. 2 is a schematic diagram showing a library and network protocol settings according to an embodiment of the invention.

The first, second, and third set of network protocol settings in FIG. 1 may be respectively assigned a name utilizing the input module 16. As shown in FIG. 2, the first, second, and third set of network protocol settings may be respectively named as "Home", "Office", and "Travel", but are not limited thereto. The first group comprises settings values required to initiate a connection in a network environment named "Home". Each of the groups comprises essential network protocol settings, such as IP addresses and various computer settings values, such as a default gateway, WINS servers, a DNS server, a proxy server, and others.

First Embodiment

Figure 3:
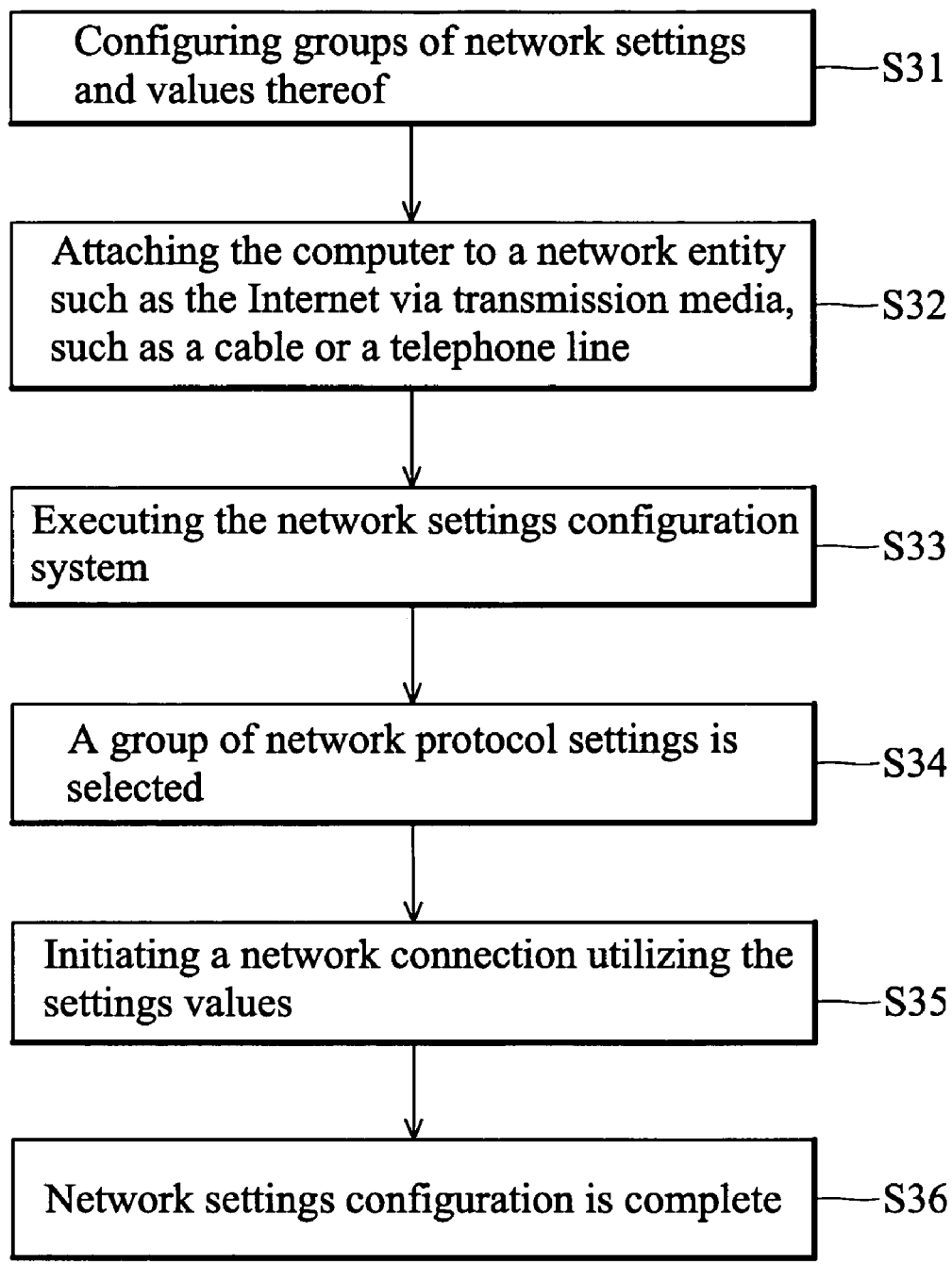
FIG. 3 is a flowchart of a network settings configuration method according to a first embodiment of the invention.

FIG. 3 is a flowchart of network settings configuration method according to the first embodiment of the invention.

The network settings configuration system according to the first embodiment of the invention performs the method. First, a user configures network protocol settings and values thereof (step S31). For example, when using a dial-up connection in a household environment, a user configures the IP address of the computer, WINS server settings, gateway IP address, and other network protocol settings and names the group of configured network protocol settings as "Home". Other groups of network protocol settings named "Office" and "Travel" are configured similarly. The computer is attached to a network entity such as the Internet via transmission media, such as a cable or a telephone line (step S32). The network settings configuration system is then executed (step S33). The user selects a group of network protocol settings corresponding to an environment (step S34). Connection initiation module 12 defines network protocol values of the selected group as default network protocol settings values of the OS of the computer and initiates a network connection utilizing the values (step S35). The network settings configuration is then complete (step S36).

Second Embodiment

Figure 4:
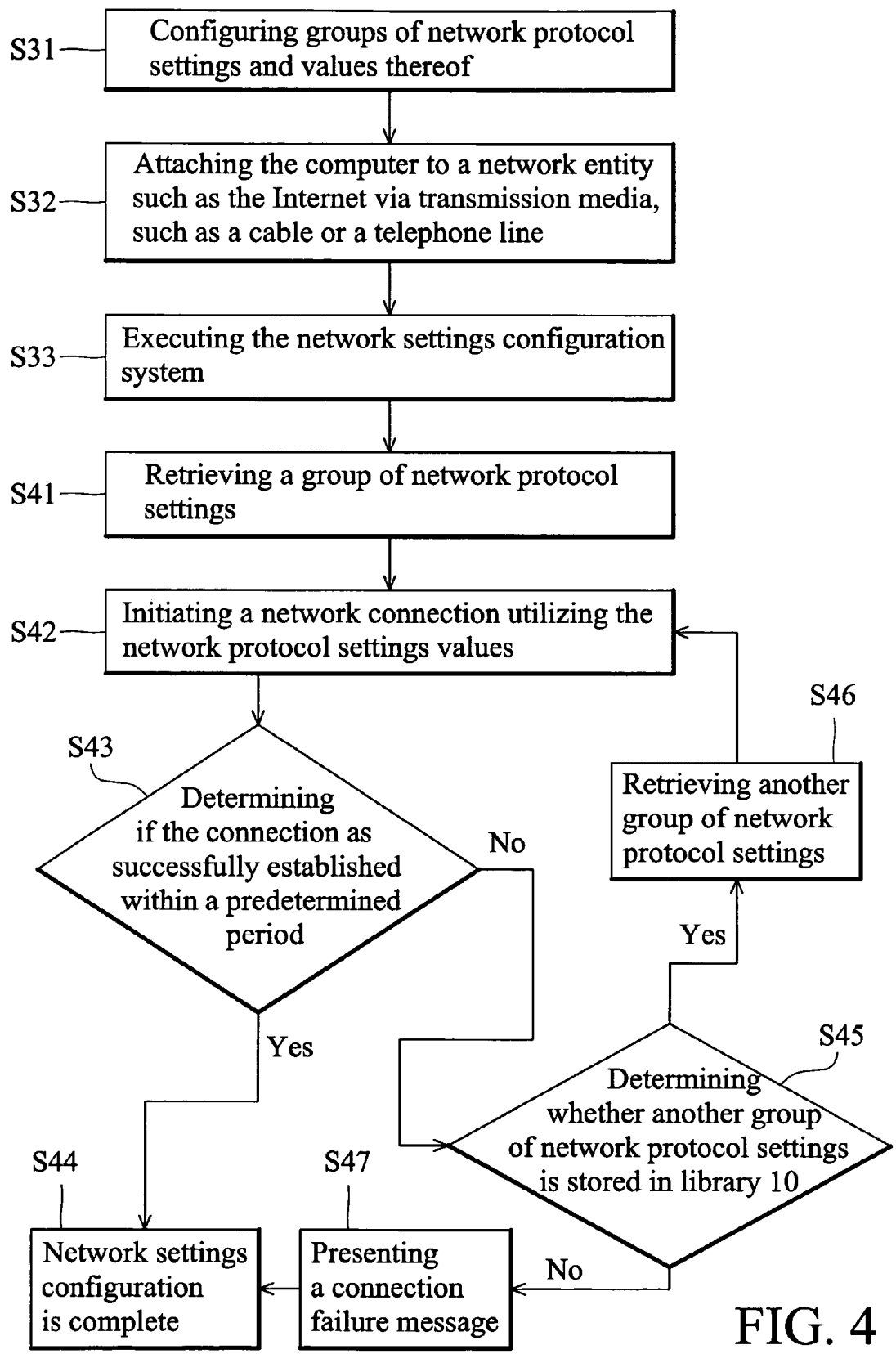
FIG. 4 is a flowchart of another network settings configuration method according to a second embodiment of the invention.

FIG. 4 is a flowchart of a network settings configuration method according to the second embodiment of the invention.

The network settings configuration system according to the second embodiment of the invention performs the method. First, a user configures groups of network protocol settings and their respective values therein (step S31). For example, when using a dial-up connection in a household environment, a user configures the IP address of the computer, WINS server settings, gateway IP address, and other network protocol settings and names the group of the configured network protocol settings as "Home". Other groups of network protocol settings named "Office" and "Travel" are configured similarly. The computer is attached to a network entity such as the Internet via transmission media, such as a cable or a telephone line (step S32). The network settings configuration system is then executed (step S33).

The previously described steps are the same as those described in the first embodiment. Connection initiation module 12 of the second embodiment automatically searches for appropriate network protocol settings without requiring manual selection. Connection initiation module 12 retrieves the first group of network protocol settings (step S41), defines network protocol settings values of the first group as the default network protocol settings values of the OS of the computer, tries to initiate a network connection utilizing the default network protocol settings values (step S42), and determines if the connection as successfully established within a predetermined period, such as 30 seconds, which may be user defined (step S43). If the connection is successfully established within the predetermined period, the network settings configuration is then complete (step S44). If the connection is not established within the predetermined period, connection initiation module 12 determines whether another group of network protocol settings is stored in library 10 (step S45). When library 10 contains another group of network protocol settings, connection initiation module 12 retrieves the existing group of network protocol settings (step S46) and returns to step S42. When library 10 does not contain another group of network protocol settings, display module 14 presents a connection failure message (step S47), and the network settings configuration is then complete (step S44).

The disclosed embodiments of the network settings configuration system and method enable a plurality of groups of network protocol settings to be pre-configured and selected manually or automatically when utilized for network connection. Thus, inconvenience encountered when reconfiguring network protocol settings for different environments can be alleviated.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A network settings configuration system, implemented by a computer capable of connecting to a network entity in a plurality of different network environments, comprising:

a library storing a plurality of groups of network protocol settings, each group of network protocol settings corresponding respectively to one of the plurality of network environments, and each group of network protocol settings comprising a plurality of settings values for establishing a network connection to the network entity in the respective network environment;

a connection initiation unit operable to initiate a network connection between the computer and the network entity upon attachment to the network entity by using in turn each of the groups of network protocol settings until the network connection is established; and wherein the connection is operable to use in turn each of the groups of network protocol settings until the network connection is established by first attempting to initiate a network connection using a default group of the groups of network protocol settings values, and when the network connection is not successfully established within a predetermined time period, attempting to initiate a network connection by using in turn each of the remaining groups of network protocol settings values for a predetermined period of time, until the network connection is successfully established or no network connection is successfully established.

2. The system as claimed in claim 1, further comprising a display module comprising a plurality of regions on which the groups of network protocol settings are respectively presented.

3. The system as claimed in claim 1, further comprising an input module receiving the values of the network protocol settings.

4. The system as claimed in claim 1, wherein the settings values comprise Internet protocol (IP) addresses.

5. The system as claimed in claim 1, wherein the settings values comprises Windows Internet Name Service (WINS) setting values.

6. The system as claimed in claim 1, wherein the settings values comprise a gateway Internet protocol (IP) address.

7. The system as claimed in claim 1, wherein the settings values comprise Domain Name System (DNS) server settings values.

8. A system as claimed in claim 1, wherein the settings values comprise a proxy server Internet protocol (IP) address.

9. The system claimed in claim 1, wherein the connection initiation unit is operable to present a connection failure message when a network connection is not successfully established after each of the groups of network protocol settings is used.

10. A network settings configuration method, implemented in a computer capable of connecting to a network entity in a plurality of different network environments, comprising:

storing a plurality of groups of network protocol settings, each group of network protocol settings corresponding respectively to one of the plurality of network environments, and each group of network protocol settings comprising a plurality of settings values for establishing a network connection to the network entity in the respective network environment;

attaching the computer to the network entity;

initiating a network connection between the computer and the network entity by using in turn each of the groups of network protocol settings until the network connection is established; and wherein the step of initiating a network connection between the computer and the network entity by using in turn each of the groups of network protocol settings until the network connection is established includes first attempting to initiate a network connection using a default group of the groups of network protocol settings values, and when the network connection is not successfully established within a predetermined time period, attempting to initiate a network connection by using in turn each of the remaining groups of network protocol settings values for a predetermined period of time, until the network connection is successfully established or no network connection is successfully established.

11. The method as claimed in claim 10, further comprising respectively displaying the groups of network protocol settings on a plurality of regions of a display.

12. The method as claimed in claim 10, further comprising entering the values of the network protocol settings.

13. The method as claimed in claim 10, wherein the settings values comprise Internet protocol (IP) addresses.

14. The method as claimed in claim 10, wherein the settings values comprise Windows Internet Name Service (WINS) settings values.

15. The method as claimed in claim 10, wherein the settings values comprise a gateway Internet protocol (IP) address.

16. The method as claimed in claim 10, wherein the settings values comprise Domain Name System (DNS) server settings values.

17. The method as claimed in claim 10, wherein the settings values comprise a proxy server Internet protocol (IP) address.

18. A method as claimed in claim 10, further comprising the step of presenting a connection failure message if a network connection is not successfully established after each of the groups of network protocol settings is used.

* * * * *